US006199708B1

(12) United States Patent
Monaco (10) Patent No.: US 6,199,708 B1
(45) Date of Patent: Mar. 13, 2001

(54) RAILCAR CUSHIONING DEVICE WITH INTERNAL ELASTOMERIC SPRING

(75) Inventor: Jay P. Monaco, Mechanicsburg, PA (US)

(73) Assignee: ASF-Keystone, Inc., Chicago, IL (US)

( * ) Notice: Subject to any disclaimer, the term of this patent is extended or adjusted under 35 U.S.C. 154(b) by 0 days.

(21) Appl. No.: 09/263,256

(22) Filed: Mar. 5, 1999

(51) Int. Cl.$^7$ ..................................... B61G 9/00
(52) U.S. Cl. ............................... 213/43; 213/41; 213/45; 188/284; 267/219; 267/226; 267/35
(58) Field of Search ................... 213/40 R, 41, 213/43, 44, 45, 46 R, 46 A; 267/35, 220, 219, 226; 188/284

(56) References Cited

U.S. PATENT DOCUMENTS

| Re. 25,273 | 10/1962 | Campbell | 213/44 |
|---|---|---|---|
| Re. 26,472 | 10/1968 | Peterson | 213/43 |
| 1,300,404 | 5/1919 | Johnson . | |
| 1,689,662 | 10/1928 | Bell et al. . | |
| 1,951,114 | 3/1934 | Wikander | 213/29 |
| 2,184,936 | 12/1939 | Clark | 213/46 |
| 2,444,305 | 6/1948 | Milhizer | 280/33.9 |
| 2,752,169 | 6/1956 | Abel | 280/304 |
| 2,802,580 * | 8/1957 | Larsson | 213/44 |
| 2,944,681 | 7/1960 | Blake | 213/43 |
| 3,040,907 | 6/1962 | Pelabon | 213/43 |
| 3,047,162 | 7/1962 | Blake | 213/8 |
| 3,135,394 | 6/1964 | Empson | 213/43 |
| 3,139,989 | 7/1964 | Thornhill | 213/223 |
| 3,150,781 | 9/1964 | Housman et al. | 213/23 |
| 3,150,782 | 9/1964 | Campbell | 213/43 |
| 3,160,285 | 12/1964 | Sinclair et al. | 213/43 |
| 3,164,262 | 1/1965 | Price et al. | 213/8 |
| 3,173,552 | 3/1965 | Zanow | 213/43 |

(List continued on next page.)

FOREIGN PATENT DOCUMENTS

| 1455279 | 4/1969 | (DE) . | |
|---|---|---|---|
| 1947819 | 3/1971 | (DE) . | |
| 2161580 | 7/1973 | (DE) | B60D/1/14 |
| 0 417 594 A1 | 9/1990 | (EP) . | |
| 1038662 | 8/1966 | (GB) . | |
| 1218811 | 1/1971 | (GB) . | |
| 2027517 | 2/1980 | (GB) | F16F/13/00 |

OTHER PUBLICATIONS

FM Industries Drawing—13–2 Cushioning Device, no date.
American Hydraulics, Inc. Drawing MA–05–1294, no date.
"Auto–Buff Cushioning Device Description" (no date).
"Auto–Gard Cushioning Device Description" (no date).
"Passive Positioning Description" (no date).
"Twin–Gard Cushioning Device Description" (no date).
G. Welty, "Thrall's integral–car solution", Railway Age, Jun., 1995, p. 53–54.
Thrall Car, "Unlock the Future of vehicle transportation with the UniversalCar.™", Railway Age, Jun., 1995, pp. 78–79.
Thrall Car, "UniversalCar™ Designed and Built by Thrall Car", 1995.
TTX Engineering and Research Newsletter, vol. 2, No. 2, $2^{nd}$ Quarter 1995, p. 4.
Nov. 3, 1997 correspondence with proposed AAR Specification, written by Jay P. Monaco to Chairman of the AAR Cushioning Device Task Force.
Proposed specification M–921E , Nov., 1997.

(List continued on next page.)

*Primary Examiner*—Mark T. Le
(74) *Attorney, Agent, or Firm*—Edward J. Brosius; Stephen J. Manich (57) ABSTRACT

A railcar cushioning device with a gas charged cylinder and a piston contained in the cylinder for cushioning buff and draft impacts. An elastomer spring is contained in the cylinder between the piston and an end of the cylinder to locate the piston in a neutral position.

14 Claims, 5 Drawing Sheets

U.S. PATENT DOCUMENTS

| | | | |
|---|---|---|---|
| 3,176,855 | 4/1965 | Mulcahy et al. | 213/43 |
| 3,185,317 * | 5/1965 | Willison | 213/44 |
| 3,186,563 | 6/1965 | Empson | 213/43 |
| 3,194,415 | 7/1965 | Rasmussen | 213/43 |
| 3,207,324 | 9/1965 | Blake | 213/8 |
| 3,216,592 | 11/1965 | Peterson et al. | 213/43 |
| 3,217,897 | 11/1965 | Peterson | 213/43 |
| 3,233,747 | 2/1966 | Abbott et al. | 213/7 |
| 3,245,552 | 4/1966 | Natschke | 213/46 |
| 3,249,240 | 5/1966 | Empson | 213/43 |
| 3,251,481 | 5/1966 | Karakashjan | 213/43 |
| 3,265,222 | 8/1966 | Goldman | 213/43 |
| 3,275,164 | 9/1966 | Peterson | 213/43 |
| 3,399,787 | 9/1968 | Zanow | 213/64 |
| 3,400,833 | 9/1968 | Powell | 213/8 |
| 3,406,835 | 10/1968 | Cook | 213/8 |
| 3,411,635 | 11/1968 | Powell | 213/8 |
| 3,446,317 | 5/1969 | Gryglas | 188/88 |
| 3,447,693 | 6/1969 | Cardwell | 213/22 |
| 3,468,433 | 9/1969 | Peterson | 213/43 |
| 3,485,385 | 12/1969 | Smith | 213/43 |
| 3,489,295 | 1/1970 | Hartel | 213/8 |
| 3,493,124 | 2/1970 | Thompson | 213/43 |
| 3,495,719 | 2/1970 | Peppers | 213/43 |
| 3,537,598 | 11/1970 | Moody | 213/8 |
| 3,556,311 | 1/1971 | Kinnecom | 213/8 |
| 3,568,856 | 3/1971 | Knippel | 213/43 |
| 3,589,527 | 6/1971 | Seay et al. | 213/8 |
| 3,589,528 | 6/1971 | Stephenson | 213/43 |
| 3,596,773 | 8/1971 | Peterson | 213/8 |
| 3,596,774 | 8/1971 | MacCurdy | 213/8 |
| 3,598,249 | 8/1971 | Vickerman | 213/8 |
| 3,599,802 | 8/1971 | Knippel | 213/8 |
| 3,622,015 | 11/1971 | Atkinson | 213/46 |
| 3,630,388 | 12/1971 | Knippel | 213/8 |
| 3,651,953 | 3/1972 | Knippel et al. | 213/43 |
| 3,682,324 | 8/1972 | Hawthorne | 213/8 |
| 3,682,461 | 8/1972 | Wachenheim | 267/31 |
| 3,712,479 | 1/1973 | Atkinson | 213/47 |
| 3,721,351 | 3/1973 | Chierici et al. | 213/8 |
| 3,729,101 | 4/1973 | Brambilla et al. | 213/45 |
| 3,752,329 | 8/1973 | Seay et al. | 213/8 |
| 3,795,390 | 3/1974 | Kendall et al. | 267/33 |
| 3,797,673 | 3/1974 | Daugherty, Jr. | 213/8 |
| 3,800,961 | 4/1974 | Hawthorne | 213/8 |
| 3,806,105 | 4/1974 | Knoishi et al. | 267/116 |
| 3,814,266 | 6/1974 | Hawthorne | 213/8 |
| 3,827,575 | 8/1974 | Mosier et al. | 213/8 |
| 4,002,244 | 1/1977 | Matsumoto et al. | 213/43 |
| 4,136,787 | 1/1979 | Forster et al. | 213/40 |
| 4,139,182 * | 2/1979 | Nagase et al. | 188/284 |
| 4,262,887 | 4/1981 | Jansen | 267/9 |
| 4,428,565 | 1/1984 | Stiefel et al. | 267/9 |
| 4,505,458 | 3/1985 | Schultz | 267/9 |
| 4,838,393 * | 6/1989 | Mourray et al. | 188/284 |
| 5,024,301 * | 6/1991 | Cook | 188/284 |
| 5,076,451 | 12/1991 | Conley et al. | 213/43 |
| 5,104,101 | 4/1992 | Anderson et al. | 267/219 |
| 5,265,710 * | 11/1993 | Gabas et al. | 267/226 |
| 5,415,303 | 5/1995 | Hodges et al. | 213/43 |
| 5,487,480 | 1/1996 | Page et al. | 213/43 |
| 5,642,823 | 7/1997 | Kalina et al. | 213/43 |
| 5,676,265 | 10/1997 | Miller | 213/49 |
| 5,746,335 | 5/1998 | Brough et al. | 213/43 |
| 5,996,978 * | 12/1999 | Asanuma et al. | 267/35 |

OTHER PUBLICATIONS

R. Hodges, FM Industries, Description of 10"–2" Active Draft Cushioning Device, dated Nov. 7, 1997, distributed to meeting attendees on Jan. 6, 1998.

R. Hodges, FM Industries, Description of 8 3/4"–1 1/4" Active Draft Cushioning Device, dated Nov. 7, 1997, distributed to meeting attendees on Jan. 6, 1998.

Facsimile message re Additional 10–2 EOCC Description, sent Nov. 10, 1997, distributed to meeting attendees Jan. 6, 1998.

AAR Cushioning Device Task Force Docket, Jan. 6, 1998 (Open Docket Item 1.B.).

U.S. Pat. App. Ser. No. 08/843,014, filed Apr. 11, 1997 by J. Monaco, J. Pershets and M. Scott.

Form PTO 850 dated May 31, 1999, pp. 1–54 re U.S. Pat. App. Ser. No. 08/843,014.

Notice Declaring Interference mailed Sep. 30, 1999 re. U.S. Pat. App. Ser. No. 08/843,014.

Abandonment of Contest in U.S. Pat. App. Ser. No. 08/843, 014, 1999.

Patrick T. Ameen, Association of American Railroads, Circular Letter, Jan. 7, 1999 and attached Specification M–921E–98, Draft 05 Aug. 1998.

American Hydraulics, Inc., "New! From American Hydraulics, Inc. Positive Buff and Draft Cushioning Devices M–921E", undated copy of single sheet card stock distributed at Sep., 1998 Railway Supply Trade Show.

American Hydraulics, Inc., "Rail Car America American Hydraulics, Inc. Active Unit New Specification M–921E", undated copy of booklet distributed at Sep., 1998 Railway Supply Trade Show, pp. 14–16.

Copy of United States Patent Application SN09/009,098 and Preliminary Amendment in Continued Prosecution Application (Jan. 20, 1998).

* cited by examiner

RAILCAR CUSHIONING DEVICE WITH INTERNAL ELASTOMERIC SPRING

FIELD OF THE INVENTION

The invention relates generally to railway car cushioning devices of the type having a hydraulic shock absorber which is moved from a neutral position for absorbing both buff and draft impacts.

BACKGROUND OF THE INVENTION

Cushioning devices are used to protect railcars and lading from impacts during coupling and train action events. Cushioning devices are commonly mounted between the frame of the railcar and couplers on the ends of the cars to reduce the high forces caused by impacts.

Impacts applied to railcars result in high forces applied to the coupler in both the buff direction and the draft direction. "Buff" is a term in the rail industry used to describe the movement experienced by the coupler when it is moved towards its associated railcar. "Draft" is a term in the rail industry used to describe the movement experienced by the coupler when it is moved away from its associated railcar. A buff impact moves the coupler towards its associated railcar. A draft impact moves the coupler away from its associated railcar.

Railcar impacts are conventionally cushioned by hydraulic cylinders. In one type of hydraulic cylinder, pressurized gas in hydraulic fluid in the cylinder biases the piston to a fully extended position. If a draft impact occurs while the piston is fully extended, the device is unable to cushion the impact because the piston cannot move further in a draft direction. In another type of gas charged hydraulic cushioning device, an externally mounted spring prevents pressurized hydraulic fluid from fully extending the piston and holds the piston in a neutral position. The piston can move from the neutral position in response to either buff or draft impacts. The external spring increases the size of the cushioning device and makes installation difficult. The external spring is exposed to dirt and other environmental contaminants that can adversely affect operation of the cushioning device. The restoring force generated by the external spring acts along a line of force spaced away from the line of action of the cylinder itself, and may cause uneven or accelerated wear of moving components.

My U.S. patent application Ser. No. 09/009,098 filed Jan. 20, 1998 and assigned to the assignee of the present application discloses a hydraulic cushioning device having an internal ring spring confined between the piston and the front head of the cylinder. The ring spring holds the piston in a neutral position to permit hydraulic cushioning of buff impacts and combined hydraulic and mechanical spring cushioning of draft impacts. A collapsible ring keeper holds the ring spring together and collapses with the ring spring. The cushioning unit described in my application has advantages over prior hydraulic cushioning units which hold the piston in a neutral position a distance from the front head of the unit. The ring spring is substantially linear along the draft collapse stroke. Also, the ring spring is relatively long and increases the length of the cushioning unit.

For some cushioning applications it is desirable to provide a spring which holds the piston of the cushioning unit in a neutral position and which also provides an increase spring rate at the end of the draft stroke to absorb large draft impacts. Additionally, it can be desirable to provide a more compact cushioning unit which holds the piston in a neutral position in order to reduce the size of the draft sill pocket and manufacture the cushioning unit more economically.

Thus, there is a need for an improved gas charged hydraulic railcar cushioning device of the type which includes an internal spring holding the piston in a neutral position where the spring provides improved cushioning in response to high draft impacts and facilitates reducing the size and cost of the cushioning unit.

SUMMARY OF THE INVENTION

The present invention is an improved railcar cushioning device that is responsive from a neutral position for absorbing buff and draft impacts. The cushioning device includes a hydraulic cylinder charged with gas pressurized hydraulic fluid. A piston in the cylinder is connected to a piston rod extending out of the cylinder through a front head. The hydraulic fluid urges the piston towards the front head of the cylinder. A spring assembly located in the cylinder includes an elastomeric spring confined between the piston and the front head of the cylinder. The elastomeric spring surrounds the piston rod. The pressurized fluid normally holds the piston against the spring in a neutral position spaced inwardly from the front head of the cylinder.

In the preferred embodiments of the present invention, the elastomeric spring includes a series of elastomer members arranged along the piston rod. During a draft impact, the elastomer members are compressed. Impact energy is stored and dissipated after the impact. The improved railcar cushioning device allows hydraulic cushioning of buff impacts and combined hydraulic and mechanical cushioning of draft impacts. In draft train action, the improved device allows for gradual force transfer from the impacted end to the other end of the freight car, thereby reducing the differential force between ends, and thus, acceleration.

In a first embodiment of the invention, the spring assembly includes a spring retainer mounted to the piston. The spring assembly moves with the piston during a buff impact. During a draft impact, the piston moves along the spring retainer and compresses the elastomeric spring. In a second embodiment of the invention, the spring assembly includes a spring retainer mounted to the front head. The spring assembly remains stationary as the piston moves away from the assembly during a buff impact. During a draft impact, the piston collapses the spring assembly and compresses the elastomeric spring.

Both spring retainers hold the elastomeric spring under a desired preload compression. The preload is sufficiently large to assure the spring keeps the piston in a neutral position or known distance from the front head over the lifetime of the device.

The elastomeric spring has a nonlinear spring rate with a lower spring rate on initial compression and an increasingly higher spring rate as the spring is compressed. The improved railcar cushioning device provides cushioning on initial draft collapse like a conventional cushioning unit that is not fully extended and increased cushioning at the end of the draft collapse stroke.

Other objects and features of the invention will become apparent as the description proceeds, especially when taken in conjunction with the accompanying drawings illustrating two embodiments of the invention, of which there are eight sheets.

DETAILED DESCRIPTION OF THE PREFERRED EMBODIMENTS

FIGS. 1–6 illustrate a first embodiment railcar cushioning device 10 installed in the center sill 12 of a railcar (not illustrated). Cushioning device 10 includes a cylinder housing 14 mounted in sill 12 between spaced pairs of stops 16 and 18. Cylinder housing 14 includes a front head 20, a rear head 22, and outer cylindrical wall 24 and interior cylindrical pressure wall 26 extending between the heads. Piston 28 in wall 26 carries a seal ring which engages the interior surface of inner wall 26 and divides the space within wall 26 into front cylindrical chamber 30 and rear cylindrical chamber 32. The seal ring prevents leakage of hydraulic fluid past the piston. Piston rod 34 extends from piston 28 out of cylinder housing 14 through bore or rod passage 36 in front head 20. Front head 20 divides piston rod 34 into an interior piston rod segment 38 located within front chamber 30 and an exterior piston rod segment 40 located outside of front chamber 30. A suitable seal is provided in the bore to prevent leakage of hydraulic fluid from the cylinder housing.

Figure 6:
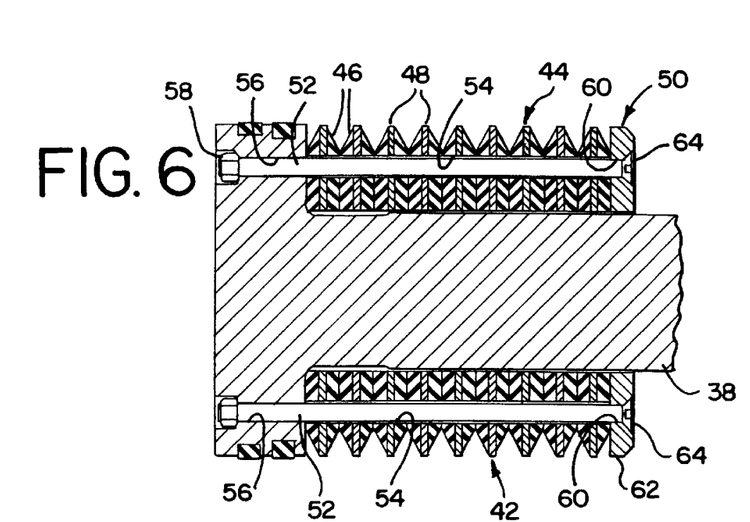
FIG. 6 is a sectional view of the spring assembly of the cushioning device shown in FIG. 1 taken along lines 6—6 of FIG. 5.

Spring assembly 42 is located in front chamber 30 between piston 28 and head 20. Spring assembly 42 is mounted on piston 28 and is held against the piston. As illustrated in FIG. 6, spring assembly 42 includes an elastomeric spring 44 surrounding interior piston rod segment 38. Elastomeric spring 44 includes a stack of annular elastomer pads 46 arranged in series. Elastomer pads 46 are preferably made from a synthetic rubber such as a styrene-butadiene rubber of the type marketed under the trademark KEY-GUARD by Keystone Industries, Inc., assignee of the present application, or a synthetic rubber of the type marketed under the trademark HYTREL by E. I. Du Pont de Numoirs and Company. Each pad includes a central flat steel ring 48. A retainer assembly 50 holds elastomer members or pads 46 and steel rings 48 together and on the piston as illustrated. Retainer assembly 50 includes a pair of slide bolts 52 that extend through bores 54 formed in elastomer pads 46 and rings 48. One end of each slide bolt 52 extends through a bore 56 in piston 28 and is threaded onto a nut 58. The other end of each slide bolt 52 extends through a bore 60 of retention plate 62 and includes a countersunk head 64 seated in bore 60. The outer diameters of bores 54 and 56 permit relative axial movement of the piston, elastomer members and rings along slide bolts 52 to the collapsed position shown in FIG. 4. Retention plate 62 normally holds elastomer pads 46 on interior piston rod segment 38 under a desired preload compression. The preload compression may be adjusted by tightening or loosening nuts 58.

Steel rings 48 and retention plate 62 have close fits in the inner cylindrical pressure wall 26 and on rod segment 38 to locate spring assembly 42 in place for engagement between piston 28 and front head 20 as shown in the drawings. The outer diameters of rings 48 and retention plate 62 are slightly less than the inner diameter of wall 26. The outer diameter of elastomer pads 46 are also slightly less than the inner diameter of wall 26.

Walls 24 and 26 define annular storage chamber or reservoir 66 extending between heads 20 and 22. One way ball valve 68 at the end of reservoir 66 permits flow of hydraulic fluid from chamber 66 into chamber 32 while preventing flow from chamber 32 into the reservoir. An additional one way ball valve (not shown) is placed at the other end of reservoir 66 to permit flow from chamber 30 into the reservoir while preventing flow from chamber 30 into the reservoir.

Figure 1:
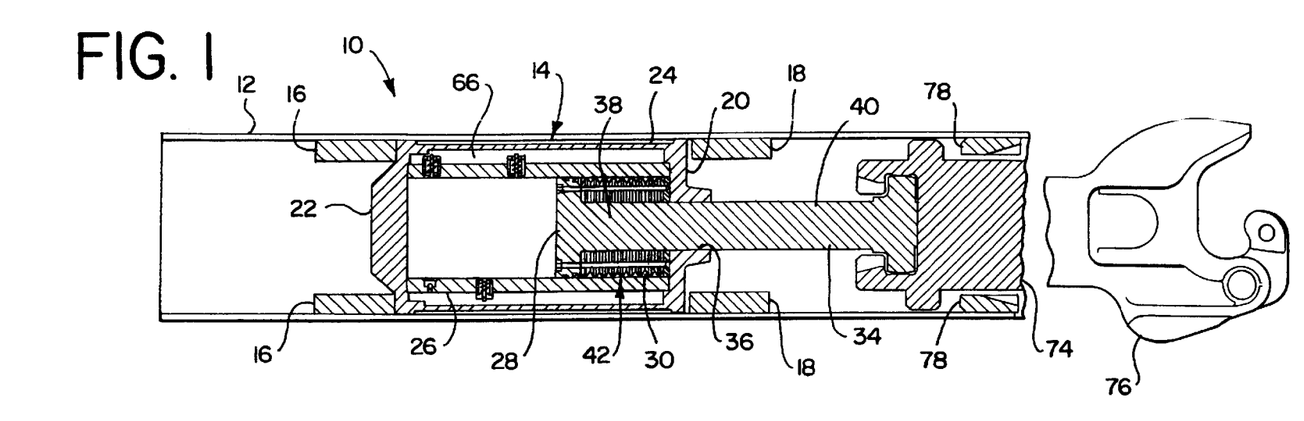
FIG. 1 is a horizontal sectional view illustrating a first embodiment railcar cushioning device constructed in accordance with this invention and shown in the neutral position.
Figure 2:
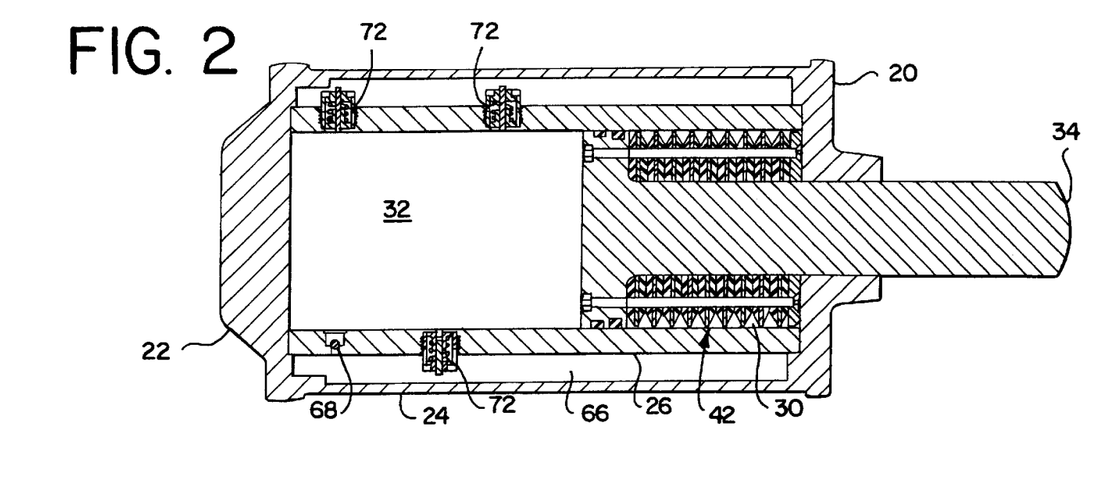
FIG. 2 is an enlarged view of the cushioning device of FIG. 1 shown in the neutral position.
Figure 3:
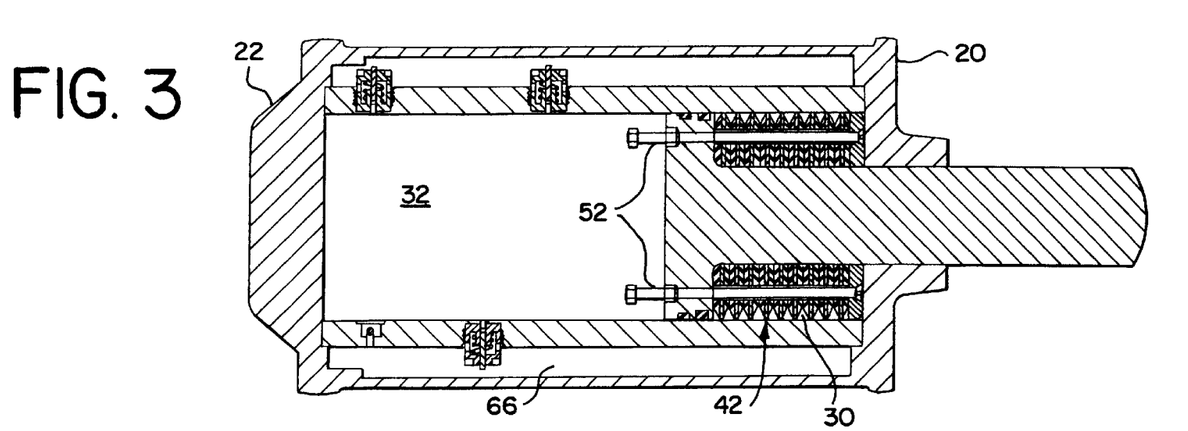
FIG. 3 is an enlarged view of the cushioning device of FIG. 1 shown collapsed in a draft direction from the neutral position.
Figure 4:
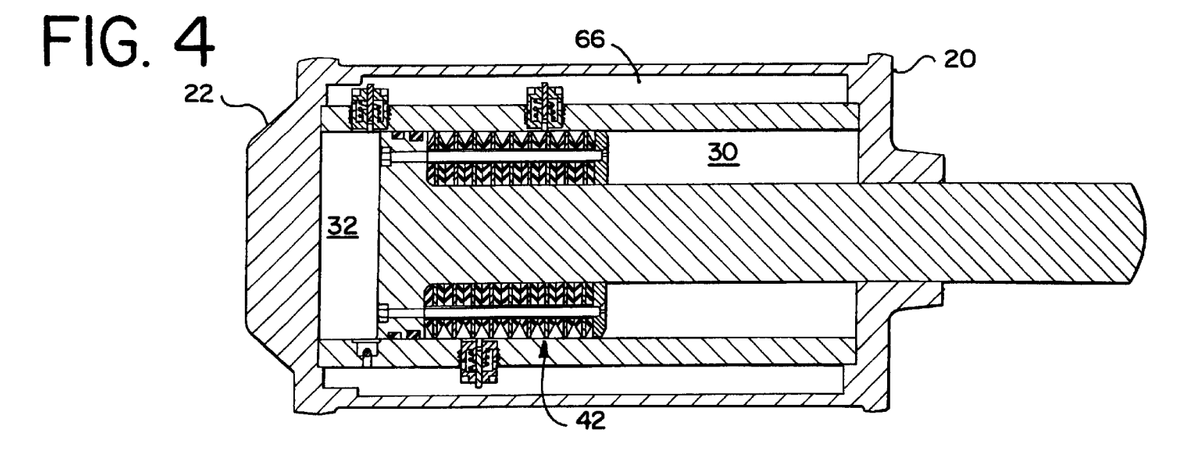
FIG. 4 is an enlarged view of the cushioning device of FIG. 1 shown collapsed in a buff direction from the neutral position.

FIGS. 1 and 3 illustrate cushioning device 10 with piston 28 located in a neutral position. Buff impacts move the piston from the neutral position along a relatively long stroke toward the rear head 22. Draft impacts move the piston from the neutral position along a relatively short path toward the front head 20. The compressed hydraulic fluid in the interior chambers of cushioning device 10 biases the piston toward the front head and into engagement with the spring assembly 42, as shown in FIG. 4, to maintain piston 28 in the neutral position so that the device may receive and cushion both buff and draft impacts.

During buff impacts hydraulic fluid in chamber 32 flows outwardly of the chamber through a number of small diameter apertures or spring backed flow control valves 72 extending through the pressure wall 26 and communicating chambers 32 and 66. Apertures or valves 72 are located on the pressure wall as required to cushion buff impacts properly. A number of small diameter apertures or spring backed flow valves (not shown) extend through wall 26 and communicate front chamber 30 and reservoir 66. The use of one-way valves, flow control valves and flow apertures in hydraulic cushioning units is known and not critical to the present invention.

Piston rod segment 40 is connected to yoke 74 and in turn to coupler 76 pivotally mounted on the yoke. Yoke 74 is slidably mounted on sill 12 between buff stops 18 and draft stops 78 for limiting movement in buff and draft directions.

Chambers 30 and 32, and reservoir 66 are charged with pressurized hydraulic fluid using conventional hydraulic oil and gas filling ports (not illustrated) provided in housing 14. When the gas and hydraulic oil are separated, the oil fills chambers 30 and 32 and partially fills reservoir 66. The gas fills the remainder of reservoir 66.

Between impacts 28 is held in the neutral position shown in FIG. 1. Internal hydraulic fluid pressure holds piston 28 against spring assembly 42. The preload of elastomeric spring 44 is selected to be greater than the force exerted by the internal hydraulic fluid pressure against piston 28 to establish the neutral position. The preload is sufficiently large to assure piston 28 is held a consistent distance from front head 20 despite changes in fluid pressure caused by the outside temperature, changes in the spring rates of elastomer pads 46 over the lifetime of the pads and the like. For railcar cushioning device 10, the preload is approximately 8,000 pounds to assure a consistent neutral position over the lifetime of the device.

If desired, the preload of elastomeric spring 44 may be less than the force exerted by the hydraulic fluid pressure and in some cases may be eliminated. If the preload is less than the force exerted by the hydraulic fluid pressure, elastomeric spring 44 will compress and piston 28 will move towards front head 20 along slide bolts 52 until the spring force exerted by elastomeric spring 44 limits further movement of the piston.

Figure 5:
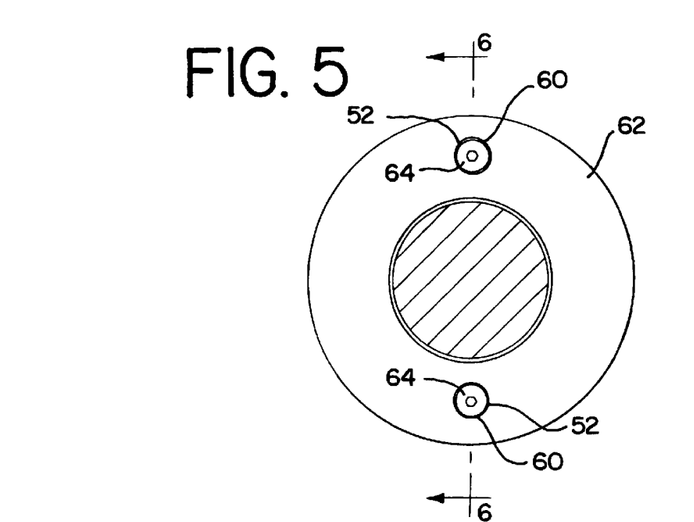
FIG. 5 is an end view of the spring assembly of the cushioning device shown in FIG. 1.

Upon a buff impact sufficient to open valves 72 (if provided) hydraulic fluid flows from chamber 32 into reservoir 66 as piston 28 moves from the neutral position towards the rear head 22 to cushion the impact hydraulically. FIG. 5 illustrates piston 28 fully displaced in a buff direction from the neutral position. Hydraulic fluid also flows from reservoir 66 to front chamber 30.

Spring assembly 42 is carried with piston 28 along wall 26 during buff movement of the piston. As shown in FIG. 5, spring assembly 42 moves with piston 28 to an intermediate position between piston 28 and front head 20. Elastomeric spring 44 is not compressed beyond its preload during the buff action and only the hydraulic resistance of cushioning device 10 cushions the buff impact. After buff impact, cushioning device 10 is returned to the neutral position by the pressurized hydraulic fluid.

Upon a draft impact sufficient to overcome the preload of elastomeric spring 44 and open any valves provided between chambers 30 and 66, piston 28 moves from the neutral position towards the front head 20. FIG. 4 illustrates piston 28 fully displaced in a draft direction from the neutral position. During draft collapse of the device 10, one-way valve 68 closes to prevent hydraulic fluid flow from front chamber 30 into reservoir 66. As piston 28 moves in the draft direction, hydraulic fluid in front chamber 30 is flowed into reservoir 66 to provide hydraulic cushioning of the draft impact.

Simultaneously with the hydraulic cushioning of the draft impact, piston 28 collapses spring assembly 42 against front head 20. Retention disc 62 and slide bolts 52 are held against front head 20 while piston 28 moves forward from nuts 58 and along slide bolts 52. Piston 28 pushes elastomeric spring 44 towards the front head 20 to compress elastomeric spring 44 between piston 28 and retention disc 62. Elastomer pads 46 elastically absorb impact energy. Heat generated during compression of the elastomeric spring is dissipated in the hydraulic fluid. Elastomeric spring 44 acts on the axis of rod 34 and does not subject the rod to eccentric loadings.

Elastomeric spring 44 has a nonlinear spring rate. The force generated by spring 44 is relatively low during initial draft collapse to provide relatively soft cushioning. The force generated by spring 44 increases at a greater rate with increasing collapse. Near the end of travel, the force generated by spring 44 is very high to bottoming of the spring. The high spring rate near the end of draft collapse stroke permits improved cushioning of severe draft impacts with a shorter collapse stroke as compared to cushioning devices having a linear spring rate.

After a draft impact, cushioning device 10 is restored to the neutral position by the spring assembly. Elastic energy stored in the elastomer pads 46 during compression pushes piston 28 toward rear head 22 along slide bolts 52 until nuts 58 reengage piston 28 to locate the piston in the neutral position. As elastomeric spring 44 extends from its compressed position, elastomer pads 46 expand and release stored elastic energy. Heat generated is dissipated in the hydraulic fluid. The bolts 52 have a close fit in bores 56 in the piston to prevent any significant flow of hydraulic fluid through the piston during buff or draft movement.

Elastomer pads 46 have an outer diameter slightly less then the interior diameter of pressure wall 26. Use of large diameter pads permits maximum energy absorption per pad during collapse of the spring and consequently reduces the length of the elastomeric spring. Reduction of the length of the elastomeric spring means that the distance between the front and rear heads in housing 14 may be advantageously minimized.

FIGS. 7–11 illustrate a second embodiment railcar cushioning device 110 installed in the center sill 112 of a railcar (not illustrated). As in the cushioning device 10, cushioning device 110 includes a cylinder housing 114 mounted in sill 112 between spaced pairs of stops 116 and 118. Cylinder housing 114 includes a front head 120, a rear head 122, and outer cylindrical wall 124 and interior cylindrical pressure wall 126 extending between the heads. Piston 128 in wall 126 carries a seal ring which engages the interior surface of inner wall 126 and divides the space within wall 126 into front cylindrical chamber 130 and rear cylindrical chamber 132. The seal ring prevents leakage of hydraulic fluid past the piston. Piston rod 134 extends from piston 128 out of cylinder housing 114 through bore or rod passage 136 in front head 120. Front head 120 divides piston rod 134 into an interior piston rod segment 138 located within front chamber 130 and an exterior piston rod segment 140 located outside of front chamber 130. A suitable seal is provided in the bore to prevent leakage of hydraulic fluid from the cylinder housing.

Spring assembly 142 is located in front chamber 130 between piston 128 and head 120. Spring assembly 142 is mounted on head 120. As illustrated in FIG. 11, spring assembly 142 includes an elastomeric spring 144 surrounding interior piston rod segment 138. Elastomeric spring 144 includes a stack of annular elastomer members 146 arranged in series. A retainer assembly 148 holds elastomer members 146 together as illustrated. Retainer assembly 148 includes an elongate sleeve 150 with a circumferential end flange 152 extending outwardly from the lefthand end of the sleeve as shown in FIG. 12. Collapsible sleeve 154 is slidably mounted on sleeve 150 and includes an interior circumferential flange 156 extending inwardly behind flange 152 to hold the two sleeves together while permitting relative movement of the sleeves to the collapsed position shown in FIG. 10. Radially outwardly extending circumferential flange 158 is provided on the free end of sleeve 154. One side of flange 158 engages the elastomer member 146 at one end of elastomeric spring 144. The other side of flange 158 engages the piston 128 to hold the piston in the neutral position.

The outer diameter of circumferential flange 158 has a close fit within the inner cylindrical pressure wall 126 to locate spring assembly 142 in place for engagement between piston 128 and front head 120 as shown in the drawings. End plate 160 is mounted on the end of sleeve 150 away from sleeve 154 and against front head 120. End plate 160 extends outwardly from sleeve 150 to an enlarged diameter bore 162 at the end of interior pressure wall 126. Radial shoulder 164 in pressure wall 126 holds end plate 160 against front head 120. Retention ring 166 holds sleeve 150 on end plate 160 with elastomeric spring 144 normally under a desired preload compression between flange 158 and end plate 160 as illustrated.

Elastomer members 146 are preferably made from a synthetic rubber such as a styrene-butadiene rubber of the type marketed under the trademark KEY-GUARD by Keystone Industries, Inc. assignee of the present application, or a synthetic rubber of the type marketed under the trademark HYTREL by E. I. Du Pont de Numoirs and Company. Each member 146 has a cross-section of revolution that includes a curved bight 168 and a pair of spaced apart legs 170, 172 extending from the bight to an inner diameter against one or both sleeves 150 or 154. The elasticity of the members 146 allows the members' inner diameter to be increased as needed to fit over the outer diameter of collapsible sleeve 154. The number and shape of the elastomer members can vary from that shown in device 110.

The outer diameter of circumferential flange 158 has a close fit within the inner cylindrical pressure wall 126 to locate spring assembly 142 in place for engagement between piston 128 and front head 130 as shown in the drawings. The outer diameters of elastomer members 146 are sufficiently less than the inner diameter of wall 126 to prevent contact of the elastomer members with interior pressure wall 126 when cushioning a draft impact.

As in the cushioning device 10, walls 124 and 126 define annular storage chamber or reservoir 174 extending between heads 120 and 122. One way ball valve 176 at the end of reservoir 174 permits flow of hydraulic fluid from reservoir 174 into chamber 132 while preventing flow from chamber 132 into the reservoir. An additional one way ball valve (not shown) is placed at the other end of reservoir 174 to permit flow from chamber 130 into the reservoir while preventing flow from chamber 130 into the reservoir.

Figure 7:
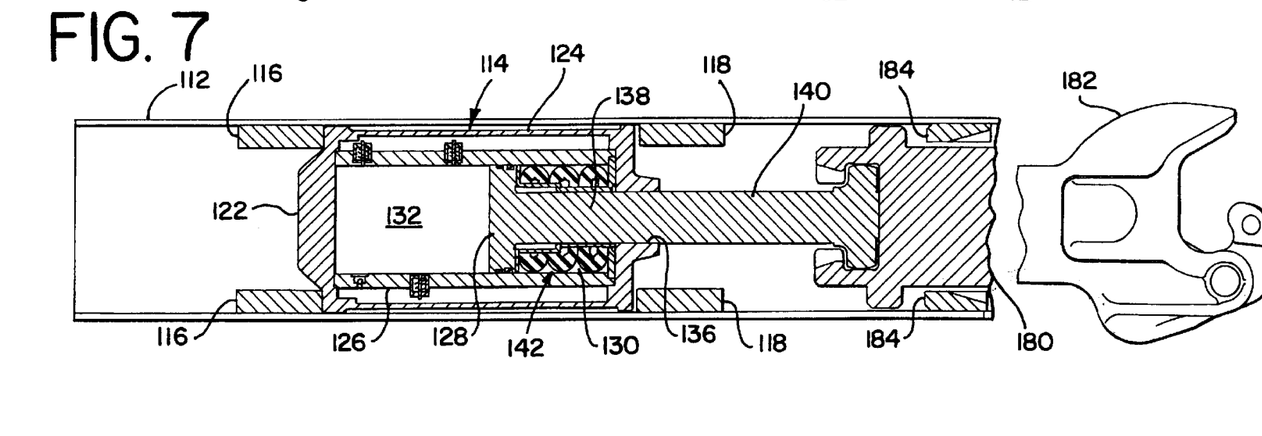
FIG. 7 is a horizontal sectional view illustrating a second embodiment railcar cushioning device constructed in accordance with this invention and shown in the neutral position.
Figure 8:
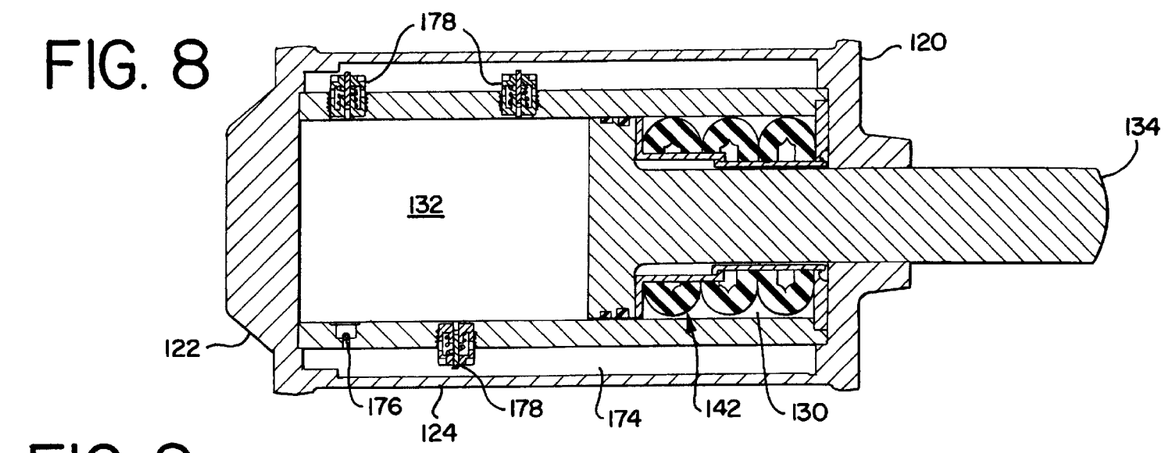
FIG. 8 is an enlarged view of the cushioning device of FIG. 7 shown in the neutral position.
Figure 9:
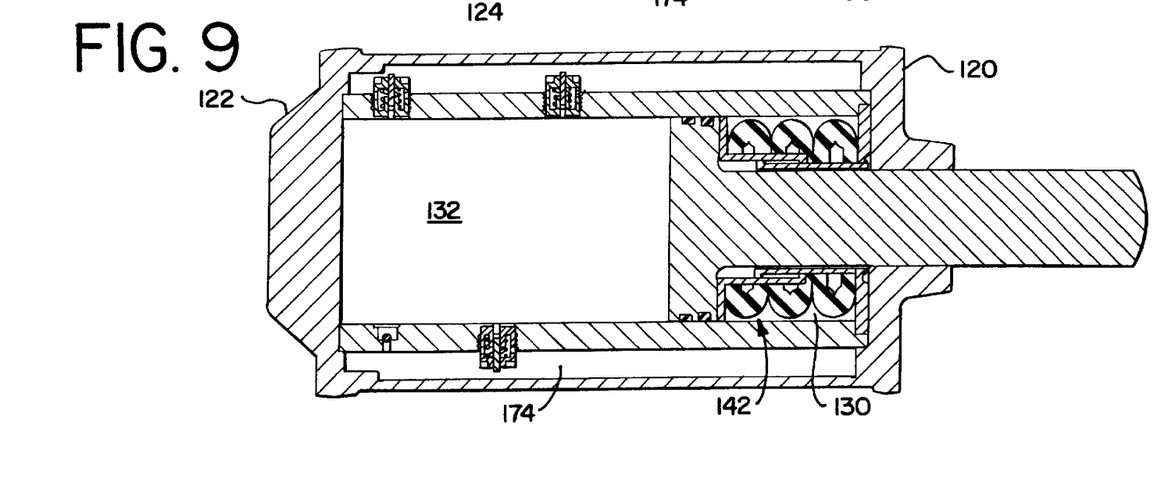
FIG. 9 is an enlarged view of the cushioning device of FIG. 7 shown collapsed in a draft direction from the neutral position.
Figure 10:
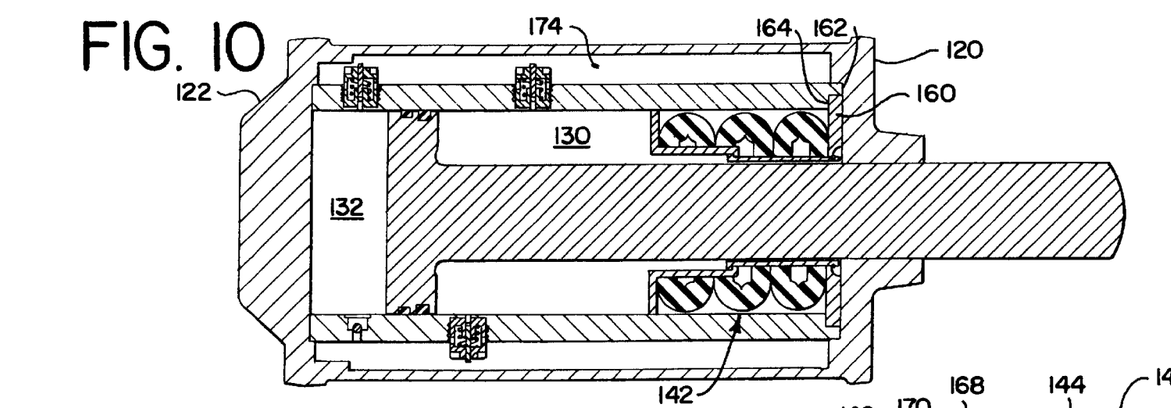
FIG. 10 is an enlarged view of the cushioning device of FIG. 7 shown collapsed in a buff direction from the neutral position.
Figure 11:
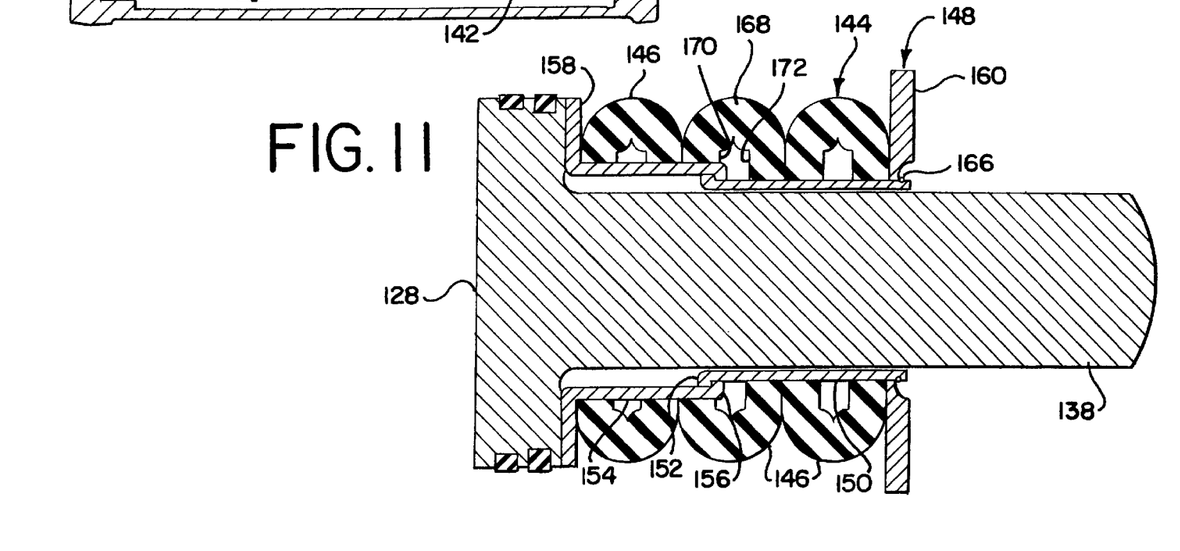
FIG. 11 is an enlarged view of the spring assembly shown in FIG. 8.

FIGS. 7 and 10 illustrate cushioning device 110 with piston 128 located in a neutral position. Buff impacts move the piston from the neutral position along a relatively long stroke toward the rear head 122. Draft impacts move the piston from the neutral position along a relatively short path toward the front head 120. The compressed hydraulic fluid in the interior chambers of cushioning device 110 biases the piston toward the front head and into engagement with the spring assembly 142, as shown in FIG. 10, to maintain piston 128 in the neutral position so that the device may receive and cushion both buff and draft impacts.

During buff impacts hydraulic fluid in chamber 132 flows outwardly of the chamber through a number of small diameter apertures or spring backed flow control valves 176 extending through the pressure wall 126 and communicating chambers 32 and 66. Apertures or valves 178 are located on the pressure wall as required to cushion buff impacts properly. A number of small diameter apertures or spring backed flow valves (not shown) extend through wall 126 and communicate front chamber 130 and reservoir 174. The use of one-way valves, flow control valves and flow apertures in hydraulic cushioning units is known and not critical to the present invention.

Piston rod segment 140 is connected to yoke 180 and in turn to coupler 182 pivotally mounted on the yoke. Yoke 180 is slidably mounted on sill 112 between buff stops 118 and draft stops 184 for limiting movement in buff and draft directions.

Chambers 130 and 132, and reservoir 174 are charged with pressurized hydraulic fluid using conventional hydraulic oil and gas filling ports (not illustrated) provided in housing 114. When the gas and hydraulic oil are separated, the oil fills chambers 130 and 132 and partially fills reservoir 174. The gas fills the remainder of reservoir 174.

Between impacts piston 128 is in the neutral position shown in FIG. 7. Internal hydraulic fluid pressure holds piston 128 against spring assembly 142. As in cushioning device 10, the preload of elastomeric spring 144 is selected to be greater than the force exerted by the internal hydraulic fluid pressure against piston 128 to establish the neutral position. The preload is sufficiently large to assure piston 128 is held a consistent distance from front head 120 despite changes in fluid pressure caused by the outside temperature, changes in the spring rates of elastomer members 146 over the lifetime of the pads and the like. For railcar cushioning device 110, the preload is approximately 8,000 pounds to assure a consistent neutral position over the lifetime of the device.

If desired, the preload of elastomeric spring 144 may be less than the force exerted by the hydraulic fluid pressure and may be zero as previously explained. If the preload is less than the force exerted by the hydraulic fluid pressure, elastomeric spring 144 will compress and piston 128 will move towards front head 120 and collapse retainer assembly 148 against front head 120 until the spring force exerted by elastomeric spring 44 limits further movement of the piston. Sleeve 150 is held against front head 120 while piston 128 pushes collapsible sleeve 154 towards the front head 120 to compress elastomeric spring 144 between flange 158 and end plate 160.

Upon a buff impact sufficient to open valves 176 (if provided) hydraulic fluid flows from chamber 132 into reservoir 174 as piston 128 moves from the neutral position towards the rear head 122 to cushion the impact hydraulically. FIG. 11 illustrates piston 128 fully displaced in a buff direction from the neutral position. Hydraulic fluid also flows from reservoir 174 to front chamber 130.

Spring assembly 142 remains stationary during buff movement of the piston. As shown in FIG. 11, spring assembly 142 remains attached to front head 120 as piston rod segment 138 moves with piston 128 to an intermediate position between piston 128 and front head 120. Elastomeric spring 144 is not compressed during the buff action and only the hydraulic resistance of cushioning device 110 cushions the buff impact. After buff impact, cushioning device 110 is returned to the neutral position by the pressurized hydraulic fluid.

Upon a draft impact sufficient to overcome the preload of elastomeric spring 144 and open any valves provided between chambers 130 and 174, piston 128 moves from the neutral position towards the front head 120. FIG. 10 illustrates piston 128 fully displaced in a draft direction from the neutral position. During draft collapse of the device 110, one-way valve 176 closes to prevent hydraulic fluid flow from front chamber 130 into reservoir 174. As piston 128 moves in the draft direction, hydraulic fluid in front chamber 130 is flowed into reservoir 174 to provide hydraulic cushioning of the draft impact.

Simultaneously with the hydraulic cushioning of the draft impact, piston 128 collapses spring assembly 142 against front head 120. Sleeve 150 is held against end plate 160 while piston 128 pushes collapsible sleeve 154 towards the front head 120 to compress elastomeric spring 144 between flange 158 and end plate disc 160. Elastomer members 146 elastically absorb impact energy. Heat generated during compression of the elastomeric spring is dissipated in the hydraulic fluid. Elastomeric spring 144 acts on the axis of rod 134 and does not subject the rod to eccentric loadings.

Elastomeric spring 144 has a nonlinear spring rate. The force generated by spring 144 is relatively low during initial draft collapse to provide relatively soft cushioning. The force generated by spring 144 increases at a greater rate with increasing collapse. Near the end of travel, the force generated by spring 144 is high to prevent bottoming, as previously described.

After a draft impact, cushioning device 110 is restored to the neutral position by the spring assembly. Elastic energy stored in the elastomer members 146 during compression pushes collapsible sleeve 154 and piston 128 toward rear head 122 until end flange 152 reengages flange 156 to return the piston to the neutral position. As elastomeric spring 144 extends from its compressed position, elastomer members 146 expand and release stored elastic energy. Heat generated is dissipated in the hydraulic fluid.

Elastomer members 146 have an outer diameter sufficiently less than the interior diameter of pressure wall 126 to prevent undesirable contact of the members with pressure wall 126 during draft movement. As the elastomer members compress during collapse of the spring, the elastomer members bulge radially outwards. Contact of the elastomer members with the interior of pressure wall 126 could prevent flow of hydraulic fluid out of front chamber 130 and cause a hydraulic lock. Friction between the elastomeric members and the interior of pressure wall 126 could also cause piston 128 to seize and could generate sufficient heat to degrade the elastomer.

Spring assembly 42 is mounted on piston 28 and is held against the piston. Spring assembly 142 is mounted on front head 120. If desired, the spring assembly may be free of the front head and piston and allowed to move axially along the interior piston rod segment without altering operation of the cushioning device. However, it is preferred that the spring assembly be mounted on the piston or front head. Otherwise, the location of the spring assembly with respect to the piston is not controlled during cushioning of a buff impact. On the return stroke the piston may impact the spring assembly near the beginning of the stroke. The forces then acting on the piston are high, increasing the risk of skewing the assembly and scoring the pressure cylinder.

The elastomer spring need not be preloaded and held together. For example, the elastomer spring may be formed as a solid elastomer body without a retainer assembly. Alternatively, the spring assembly may be slidably mounted on the interior segment of the piston rod. In such case, the elastomeric spring may be mounted on a plastic sleeve that slides on the piston rod.

While I have illustrated and described preferred embodiments of my invention, it is understood that this is capable of modification, and I therefore do not wish to be limited to the precise details set forth, but desire to avail ourselves of such changes and alterations as fall within the purview of the following claims.

What I claim as my invention is:

1. A railcar cushioning device comprising a cylinder extending between a first head and a second head, pressurized hydraulic fluid in said cylinder, a piston in said cylinder, a piston rod extending from said piston sealingly through said first head, said hydraulic fluid urging said piston toward said first head, an elastomeric spring in said cylinder between said piston and said first head to locate the piston in a neutral position a distance from the first head and the second head, and a first connection between said piston and said elastomeric spring mounting said elastomeric spring to said piston; said piston being axially movable toward said second head in response to a buff impact of sufficient magnitude; said first connection including a contact surface axially spaced from said piston and having a portion radially spaced from said piston rod, said contact surface being separate from said cylinder, said spring being between said contact surface and said piston.

2. The device of claim 1 wherein said contact surface of said first connection comprises a spring retainer located adjacent to a first end of said elastomeric spring.

3. The device of claim 2 wherein said spring retainer includes a tension member extending from said contact surface to said piston, and a second connection between said contact surface and said tension member.

4. The device of claim 3 wherein said tension member includes a rigid body extending from said contact surface to said piston and said first connection slidably mounts said rigid body to said piston, said rigid body being radially spaced from said piston rod.

5. The device of claim 3 wherein said contact surface comprises an annular plate surrounding said piston rod; and wherein said second connection includes a bore extending through said annular plate; and said tension member extends through said bore.

6. The device of claim 1 further including a hydraulic fluid reservoir surrounding said cylinder.

7. A railcar cushioning device comprising a cylinder extending between a first head and a second head, pressurized hydraulic fluid in said cylinder, a piston in said cylinder, a piston rod extending from said piston sealingly through said first head, said hydraulic fluid urging said piston toward said first head, said piston being movable in an axial direction; an elastomeric spring in said cylinder, and a first connection between said piston and said elastomeric spring mounting said elastomeric spring to said piston, said elastomeric spring normally engaging said piston and said first head to locate the piston in a neutral position a distance from the first head; wherein said first connection comprises a spring retainer located adjacent to a first end of said elastomeric spring, a second end of said elastomeric spring being located at said piston; wherein said spring retainer includes a retention member located at said first end of said elastomeric spring, a tension member extending from said retention member to said piston, and a second connection between said retention member and said tension member; wherein said tension member includes a rigid body extending from said retention member to said piston; wherein said first connection slidably mounts said rigid body to said piston, wherein said first connection includes a bore extending through said piston; and wherein said rigid body slidingly extends through said piston bore.

8. The device of claim 7 wherein said elastomeric spring comprises a plurality of annular elastomer pads surrounding said piston rod and spaced in series along said piston rod, each pad having an outer diameter slightly smaller than an inside diameter of said cylinder.

9. A railcar cushioning device for cushioning both buff and draft impacts, said cushioning device comprising:

a cylinder having a first head at one cylinder end, a second head at an opposed cylinder end, said cylinder end heads defining an interior chamber extending along the length of the cylinder;

a piston located in said chamber and sealingly engaging said cylinder, the piston dividing said chamber into a first chamber portion adjacent said first head and a second chamber portion adjacent said second head and movable along the cylinder between said heads;

a piston rod joining the piston and extending from the piston through the first head to a piston rod end;

pressurized hydraulic fluid in said cylinder chamber urging said piston toward said first head;

an elastomeric spring located in said first chamber portion and surrounding said piston rod, said pressurized hydraulic fluid normally holding said piston against the elastomeric spring in a neutral position in the chamber, the neutral position spaced between said first and second heads;

said elastomeric spring comprising at least one annular elastomer pad having a portion with one outer diameter and a narrow portion having a reduced outer diameter, the outer diameter of said elastomer pad being smallest at said narrow portion;

said piston having a first energy absorbing stroke extending from the neutral position a distance along the cylinder toward the first head and a second energy absorbing stroke extending from the neutral position a distance along the cylinder toward the second head;

said first and second energy absorbing strokes being in axial directions;

said device further including an annular element having a contact surface axially spaced from the piston, at least a part of said contact surface being radially spaced from said piston rod, said contact surface having an outer diameter, said contact surface of said annular element and said cylinder being capable of relative axial movement during at least one of said energy absorbing strokes;

said elastomer pad being between said contact surface of said annular element and said piston, said contact surface of said annular element being juxtaposed with said narrow portion of the elastomer pad, the outer diameter of the contact surface of the annular element being greater than the outer diameter of the narrow portion of the elastomer pad.

10. The device of claim 9 wherein said elastomer spring includes at least two annular elastomer pads.

11. The device as in claim 9 wherein said annular element comprises a spring retainer and wherein said elastomeric spring is preloaded.

12. The device of claim 11 wherein said spring retainer includes a tension member extending axially along the length of the elastomeric spring, said tension member being distinct from said piston rod.

13. The device of claim 12 wherein said annular element comprises an end member mounted on the tension member and engaging one end of the elastomeric spring.

14. The device of claim 9 wherein said annular element has an axial dimension that is less than one-half the distance between the first head of the cylinder and the nearest surface of the piston when the piston is in the neutral position.

* * * * *